United States Patent [19]

Kopetz

[11] Patent Number: 6,145,008
[45] Date of Patent: Nov. 7, 2000

[54] CONFLICT FREE TIME-TRIGGERED METHOD AND APPARATUS FOR THE TRANSMISSION OF MESSAGES IN A DISTRIBUTED REAL-TIME COMPUTER SYSTEM

[76] Inventor: Hermann Kopetz, Am Buhel 112, A-2500 Baden-Siegenfeld, Austria

[21] Appl. No.: 08/910,959

[22] Filed: Aug. 7, 1997

Related U.S. Application Data

[63] Continuation of application No. 08/527,489, Sep. 13, 1995, abandoned.

[51] Int. Cl.$^7$ .............................. G06F 13/38; G06F 15/17
[52] U.S. Cl. ........................... 709/236; 709/232; 370/476
[58] Field of Search ........................ 395/200.66, 200.62, 395/200.6; 370/468, 476; 709/236, 232, 230

[56] References Cited

U.S. PATENT DOCUMENTS

| | | |
|---|---|---|
| 4,168,469 | 9/1979 | Parkih et al. . |
| 4,365,296 | 12/1982 | Ulmer . |
| 4,907,222 | 3/1990 | Slavik . |
| 5,001,642 | 3/1991 | Botzenhardt et al. . |
| 5,208,807 | 5/1993 | Gass et al. . |
| 5,303,347 | 4/1994 | Gagne et al. . |
| 5,343,472 | 8/1994 | Michihira et al. . |
| 5,355,368 | 10/1994 | Dore et al. . |
| 5,524,213 | 6/1996 | Dais et al. . |
| 5,537,549 | 7/1996 | Gee et al. . |
| 5,553,308 | 9/1996 | Vink . |
| 5,555,548 | 9/1996 | Iwai et al. . |

FOREIGN PATENT DOCUMENTS 9406080  3/1994  WIPO .

OTHER PUBLICATIONS

SAE Paper J 2056/2 "Survey of Known Protocols", published in the 1994 essay E Handbook, vol. 2, pp. 23.372–23.390.

"Clock Synchronization in Distributed Real Time Systems" by Kopetz and Ochsenreiter, *IEE Transactions on Computers*, Aug. 1997, pp. 933–940.

1992 SAE Handbook vol. 2, "Society of Automotive Engineers", p.20.301.

SAE Paper J 2056/2 Survey of Known Protocols, published in the 1994 essay E Handbook, vol. 2, pp. 23.372–23.390.

Clock Synchronization in Distributed Real Time Systems by Kopetz and Ochsenreiter *IEE Transactions on Computers*, Aug. 1987, pp. 933–940.

1992 SAE Handbook vol. 2, Society of Automotive Engineers, p. 20–301.

*Primary Examiner*—Mark H. Rinehart
*Attorney, Agent, or Firm*—Thomas R. Vigil

[57] ABSTRACT

This invention concerns a time-triggered method and a device for the autonomous transmission of messages within a distributed real-time computer architecture, consisting of a plurality of nodes that are connected to a shared communication channel. This method uses either an available standard communication control unit (e.g., UART, CAN, J1850 or others) or an augmented communication control unit. It provides an efficient low-cost communication service, including the clock synchronization. This new method supports composability by an autonomous time-triggered operation of the data transmission system. It is characterized by a predictable timing behavior, a high data efficiency, and a short error detection latency.

6 Claims, 4 Drawing Sheets

SEQUENCE OF EVENTS DURING A TRANSMISSION

FIG. 2

$[SDT, ADT] = dtrans (1-\rho) - g$ $[SDT, DPT] = dtrans (1+\rho) + \varepsilon + \Delta + g$ $[ADT, DPT] = 2\, dtrans \cdot \rho + \varepsilon + \Delta + 2g$ $[RDI, SDT] = dproc^{max} + 2\, dtrans \cdot \rho + 2\varepsilon + \Delta + 2g$ $[RDI, ADT^+] = dproc^{max} + dtrans\, (1+\rho) + 2\varepsilon + g$ $[RDI, DPT^+] = dproc^{max} + dtrans\, (1+3\rho) + 3\varepsilon + 2\Delta + 3g$ $[RDI^{FW}, ADT] = dproc^{max} + dtrans\, (1+3\rho) + 3\varepsilon + 2\Delta + 4g$ $\text{slot-time}^{max} = dproc^{max} + dtrans\, (1+\rho) + 2\varepsilon + \Delta + 2g$ $dtrans$: transmission time $dproc^{max}$: max. proc. time

TIMEOUT PARAMETER FOR SINGLE BYTE MESSAGES

CONFLICT FREE TIME-TRIGGERED METHOD AND APPARATUS FOR THE TRANSMISSION OF MESSAGES IN A DISTRIBUTED REAL-TIME COMPUTER SYSTEM

CROSS-REFERENCE TO RELATED APPLICATIONS

This application is a continuation of U.S. application Ser. No. 08/527,489 filed Sep. 13, 1995 now abandoned.

BACKGROUND OF THE INVENTION

1. Field of the Invention

This invention concerns a time-triggered method and apparatus for the autonomous transmission of messages within a distributed real-time computer architecture. Such a computer architecture consists of a plurality of nodes. Each node has at least one communication control unit which is connected to a common communication channel shared by all notes. The communication is organized in rounds, where the structure and the attributes of a round are defined at a priori in a message descriptor list that specifies at which temporal position of the round a node has to send or receive a particular message.

This data transmission method is of particular interest to the automotive industry. There is an increasing tendency to replace electromechanical control devices within an automobile, such as an engine controller or a power window controller, by single-chip computer nodes. These single chip microcontrollers offer significant improvements in the cost/performance ratio and in the reliability over the devices they replace. The selection of the best interconnection technology between these nodes is a new challenge to the design engineer: On the one side there is the paramount concern for minimal production cost. This would suggest that a network based on a single wire bus as the preferred solution. On the other side there is an increasing concern for desirable system properties, such as composability in the temporal domain, testability, short error detection latency, dependability, and configuration flexibility. These system properties are determined to a large extent by the communication protocol that controls the information transfer between the different nodes.

2. Description of the Prior Art

According to the state of the art there exist many different methods for the transmission of messages in a distributed real-time computer system (see., e.g., the SAE paper J 2056/2—survey of known protocols, published in the 1994 SAE Handbook, Vol. 2, pp. 23273, Society of Automotive Engineers, Warrendale, Pa., 1994).

All of these published methods are event-triggered.

In an event-triggered method, the host computer has to generate an event that initiates the communication. A novel time-triggered method, where the activation of a message transmission is derived from the progression of time and not from an event generated by the host computer, for the autonomous transmission of messages in safety critical real-time applications is contained in the PCT Patent Application PCT/AT 93/00138 dated 4 September 1992.

Examples of analogous and non-analogous previously proposed message transmission systems are disclosed in the following U.S. and foreign patents:

| U.S. Pat. No. | Patentee |
| --- | --- |
| 4,168,469 | Parikh, et al. |
| 4,365,296 | Ulmer |
| 4,907,222 | Slavik |
| 5,001,642 | Botzenhardt, et al. |
| 5,208,807 | Gass, et al. |
| 5,303,347 | Gagne, et al. |
| 5,524,213 | Dais, et al. |
| 5,343,472 | Michihira, et al. |
| 5,355,368 | Dore, et al. |
| 5,537,549 | Gee, et al. |
| 5,553,308 | Vink |
| 5,555,548 | Iwai, et al. |
| PCT Published Patent Applications | |
| WO 9406080 | Kopetz |

It is an object of the present invention to provide a method for non-safety critical real-time applications that can be used on low cost microcontrollers and/or communication control units and to achieve high data efficiency combined with a short latency for the detection of message errors or node failures. It is another object of the present invention to provide a low cost apparatus for carrying out the new method.

SUMMARY OF THE INVENTION

In accordance with the invention, the method provides that every round starts with a control message that is sent by the active master and which specifies which one of the a priori defined message descriptor lists has to be selected for the control of the current round and where the transmission continues autonomously, driven by the progression of time, until the sequence of all data messages that is specified in the selected message descriptor list has been exchanged. The control message preferably has characteristic attributes in the value domain or in the time domain, or in both, where these characteristic attributes of the control message are significantly different from those of the data messages. In a preferred embodiment, the control message has an even parity while the data messages have odd parity, or vice versa, and the time interval between the control message and the first date message is significantly longer than the time interval between successive data messages. The method according to the present invention, therefore, is a time-triggered method for non-safety critical real-time applications, e.g., body electronic applications that use low cost microcontrollers with available communication control units (e.g., UART, SAE J1850, CAN, or others as described in the SAE paper J 2056/2—survey of known protocols, published in the 1994 SAE Handbook, Vol. 2, pp. 23273, Society of Automotive Engineers, Warrendale, Pa., 1994). This new method has a number of advantages over the known event-triggered methods:

Autonomously controlled conflict free access to the communication channel with predictable temporal properties Composability in the temporal domain, eliminating all unintended temporal side effects during system integration Short latency for the detection of message errors or node failures High data efficiency Usability on standard serial communication control units (e.g., UART, CAN, or SAE J1850) that are in widespread use in the industry.

According to the invention further, a low cost apparatus is provided which is based on an available communication control unit (e.g., UART, CAN, J1850 or others) where this new transmission method is implemented in software or hardware or a combination of software and hardware, and where the device is either a stand alone communication control unit or is part of a single chip microcomputer. Alternatively, the hardware of a standard communication control unit (e.g., UART, CAN, J1850, or others) is preferably augmented, e.g., by a microcontrollable protocol processor and a timer, such that this method can be executed autonomously within the augmented communication control unit.

DESCRIPTION OF THE PREFERRED EMBODIMENT(S)

Figure 1:
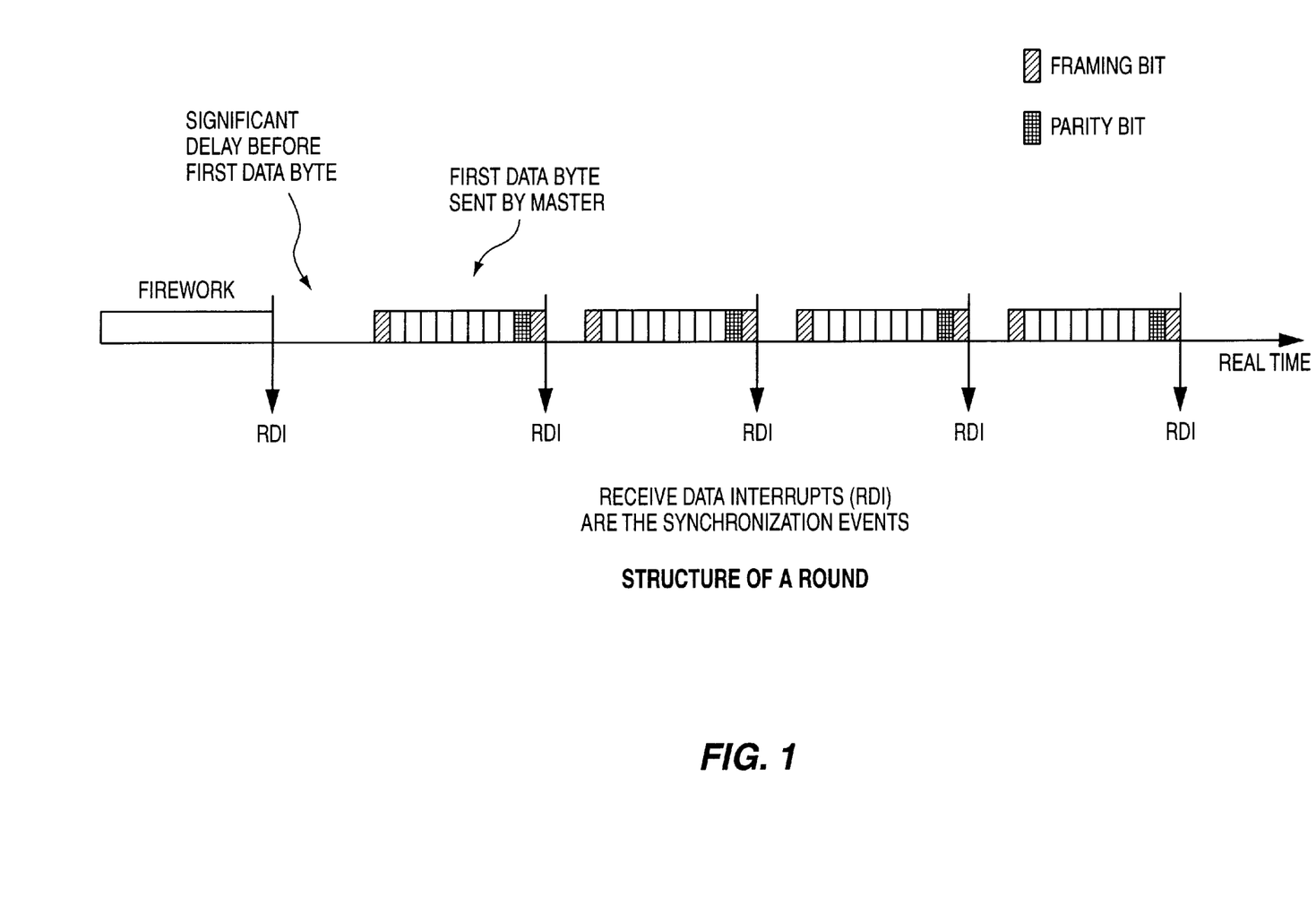
FIG. 1 shows an example of the structure of a communication round comprising one byte message.

In the following sections, this new message transmission method is explained by making reference to the attached Figures, FIG. 1, FIG. 2 and FIG. 3.

At any one time a communication system contains one active master node and a set of slave nodes. All communication activities are organized into rounds. A round is the transmission of a sequence of messages that is specified a priori in a Message Description List (MEDL). The MEDL contains the point in time when a message has to be sent or will arrive relative to the start of the round and the attributes of each message, e.g., the length of the message, the type of the message, and the location of the message data in the memory. An example of the structure of a round composed of one byte messages is depicted in FIG. 1. A round starts with a special control message, the Fireworks, that is transmitted by the active master at a predefined recurring point in time. The Fireworks messages serves two purposes: Its arrival, signalled by the Receive Data Interrupt (RDI) of the communication controller, is the global synchronization event for the start of a new round, and it contains the name of the active MEDL for this round. The Fireworks is followed by a sequence of data messages from the individual nodes as specified in the active MEDL. A round terminates when the end of the active MEDL is reached. Every round is independent of the previous round.

To be able to differentiate between a Fireworks message and a data message, the Fireworks message has characteristic features in the value domain and in the time domain that differentiate the Fireworks message from the data messages: For example, the Fireworks message has an odd parity while all data messages have even parity. The intermessage gap between the Fireworks message and the first data message is significantly longer than the intermessage gap between the succeeding data messages (see FIG. 1).

These characteristic features make it possible for all nodes to recognize a new Fireworks message, even if some faults have disturbed the communication during the previous round. The characteristic features of the Fireworks message simplify the reintegration of repaired notes—a repaired node monitors the network until a correct Fireworks message is detected.

The execution of a round in each node is controlled by the progression of time (a number of timeouts) and by the "Receive Data Interrupt" (RDI) from the UART (or the corresponding signal from another communication control unit) that serves as a global synchronization event.

At any one time the protocol is in one of the following states:

| | |
|---|---|
| NA | No Data Awaited—no data message is expected |
| WD | Wait for Data—a node waits for a new data message |
| DR | Data Received—a node has received a new data message |
| DP | Data Processing—a node is processing the received Fireworks or data |
| WF | Wait for Fireworks—a node waits for a new Fireworks message |
| FR | Fireworks Received—a node has received a new Fireworks message |
| SF | Send Fireworks—the master is allowed to send a new Fireworks message |
| ER | Error—an incorrect or unexpected event has occurred |

After initialization, all slave nodes will be in the state "Wait for Fireworks" while the master is in the state "Send Fireworks".

The state transitions are controlled by the occurrence local timeouts (e.g., expected arrival of the next message) and by the event of a new message arrival, the receive data interrupt (RDI) from the controller. The software interface to the application software in the host computer is free from any control signals.

The following significant events that control state transitions are distinguished:

| | |
|---|---|
| ADT | Await Data Timeout, causing the state transition from NA to WD |
| RDI | Receive Data Interrupt, causing the state transition from WD to DR |
| DPT | Data Processing Timeout, causing the state transition from DR to DP |
| SDT | Send Data Timeout, causing the state transition from DP to NA |
| $ADT^{FD}$ | ADT of the first Data message |
| $ADT^{FW}$ | ADT of the Fireworks message |
| $RDI^+$ | RDI of the next Data message |
| $RDI^{FW}$ | RDI of the Fireworks message |

Figure 2:
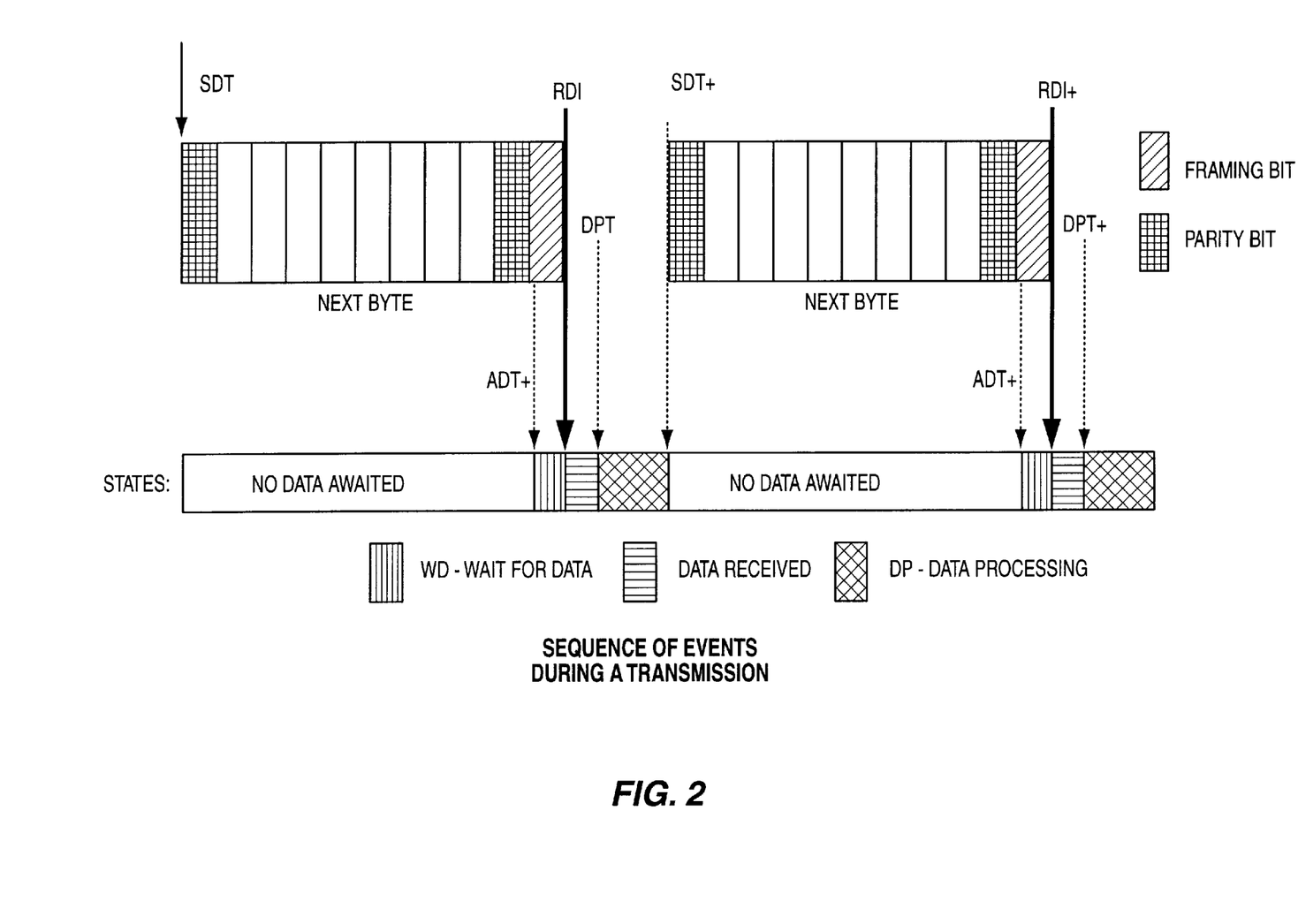
FIG. 2 shows the sequence of events during a transmission slot in a round according to FIG. 1.
Figure 3:
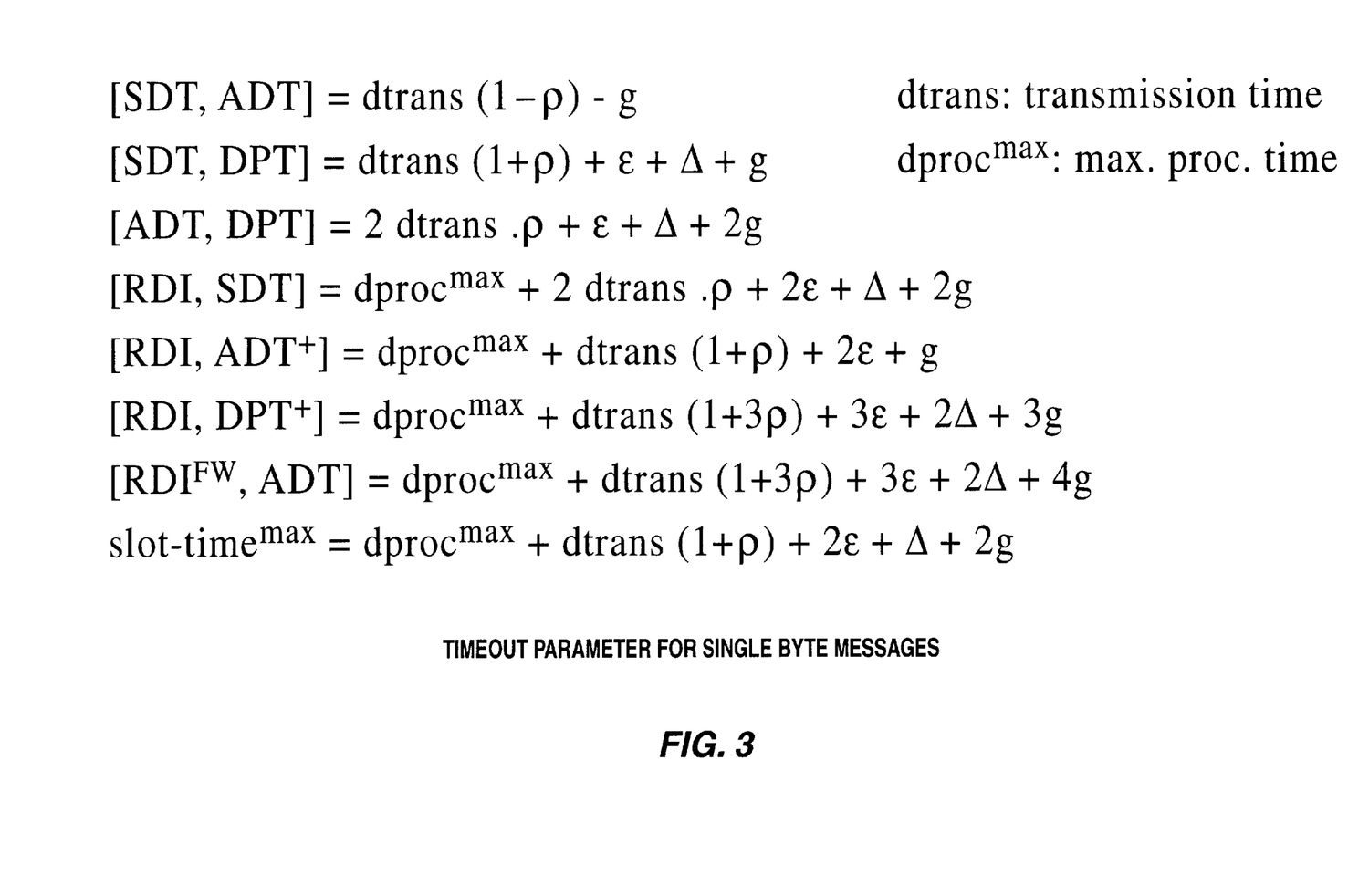
FIG. 3 shows a list of time out parameters for single byte messages.

FIG. 2 shows the sequence of states and the state transitions that occur within a communication slot. The contents of the active MEDL determine the occurrence of the Send Data Timeout (SDT), when a node starts to send a message and enters the state No Data Awaited. Before this message arrives at any one of the other nodes, the Await Data Timeout (ADT) causes a state change to the state Wait for Data (WD). The Receipt of the Message, which is monitored by the Data Processing Timeout (DPT), causes a state transition to the state Data Received (DR). The Data Processing Timeout (DPT) initiates the protocol processing and causes the state transition to the state Data Processing (DP). Depending on the contents of the MEDL, at the end of data processing there is either a new send event (SDT) or the node enters the state No Data Awaited until the next ADT timeout occurs.

As can be inferred from FIG. 2, the following relations have to hold between the intervals bounded by the two indicated events (in square brackets) at all nodes at all times (an + denotes the event in the next transmission slot):

[RDI, ADT]<[RDI, RDI+]<[RDI, DPT+]

Since it is required that the time difference between the fireworks message and the first data message is significantly longer than the time difference between any of the two following data messages, the following relation must also hold:

[RDI, SDT]<[RDI$^{FW}$, SDT$^{FD}$]

These two relations are the basis for the calculation of the timeout values.

In this new data transmission method, the local clocks of the nodes are resynchronized by the "Receive Data Interrupt", the globally visible synchronization event from the current sender. The achievable precision $\Delta$ of the clock synchronization is determined by the following four parameters: the interrupt response time of the node hardware and software, the granularity of the local clock, the quality of the resonator, and the length of the resynchronization interval.

The interrupt response time is defined as the time interval between the point in time of arrival of the last bit (e.g., the stop bit) of the message in the controller and the point in time of reading the local free running clock by the software in the receiving node. We call the difference over all nodes and all times between the maximum interrupt response time $d_{max}$ and the minimum interrupt response time $d_{min}$ the reading error $\epsilon$. In a central synchronization scheme, the convergence function, i.e., the maximum difference between any two clocks immediately after synchronization, is $\epsilon+g$, where g is the granularity of the local time (see Kopetz, H., Ochsenreiter V., Clock Synchronization in distributed Real-time Systems, IEEE Transactions on Computers, August 1987, pp. 933–940, for a detailed explanation of the clock synchronization theory). Between any two resynchronization the clocks are free running. The rate between any two clocks can differ by $2\rho$, where $\rho$ is the maximum deviation of the drift rate of a clock from the nominal rate, determined by the physical quality of the resonator. If a recynchronization is guaranteed to happen after a given time interval Rsync, then the achievable precision of the ensemble is $\Delta=\epsilon+g+2\rho$ Rsync.

During normal operation, this new data transmission method resynchronizes the clocks after the arrival of the next message. In order to tolerate n message omissions (loss of a message or failure of a node), Rsync is set to (n+1) message transmission times. The parameter n is application dependent. In our examples, we set this parameter to 3.

Given the following parameters:

| | |
|---|---|
| dtrans | nominal message transmission time |
| $\rho$ | nominal drift rate of the resonator |
| g | granularity of local time measurement |
| $\Delta$ | Precision of the clock synchronization system |
| $\epsilon$ | Reading error |
| dproc$^{max}$ | maximum processing time of protocol software within a node |
| slot-time$^{max}$ | maximum slot time, i.e., the interval between two successive send operations | the values for the timeouts of this new transmission method can be calculated.

These timeouts are dependent on the precision $\Delta$ of the synchronized clocks, given by $\Delta=\epsilon+g+2\rho$Rsync. If two events are initiated by two nodes at their same local time, the occurrence times of these two events can differ, as seen by an omniscient outside observer, by at most $\Delta$.

In the following section an example of the timeout calculations is given for the case where a sequence of one byte messages is transmitted by a UART controller. The RDI interrupt can happen at the sending node with the fastest resonator in the earliest case at dtrans($1-\rho$) after sending (where dtrans is the nominal transmission time of a single one byte message). Since ADT must occur before the earliest arrival, we select a value for ADT of dtrans($1-\rho$)$-g$ (in relation to SDT). DPT must happen after the RDI interrupt of the node with the slowest resonator. Since this node can be one $\Delta$ behind and can have a delay of the interrupt by $\epsilon$, a proper value for DPT in relation to SDT is dtrans($1+\rho$)$+\Delta+\epsilon+g$. The time window when the next RDI may occur has thus a length of 2dtrans $\rho+\Delta+\epsilon+2g$, as documented in FIG. 3.

Since we resynchronize on RDI, the interval [RDI, SDT] must be selected such that even the latest and the slowest node will have completed the processing of the previous message. This gives a value [RDI, SDT]=dproc$^{max}$+2dtrabs $\rho+\Delta\epsilon+2g$, where dproc$^{max}$ denotes the maximum processing time of a message.

The delay between the Fireworks message and the first data message must be significantly longer than the longest interdatebyte separation. It follows that [RDIFW, ADT] must be at least dproc$^{max}$+dtrans($1+3\rho$)$+2\Delta+3\epsilon+4g$.

The maximum slot time between any two data messages is thus:

Slot-time$^{max}$=dproc$_{max}$+dtrans $(1+\rho)+2\epsilon+\Delta+2g$.

The slot time forms the basis for the calculation of the data efficiency of the protocol. All these timeout parameters are listed in FIG. 3.

Figure 4:
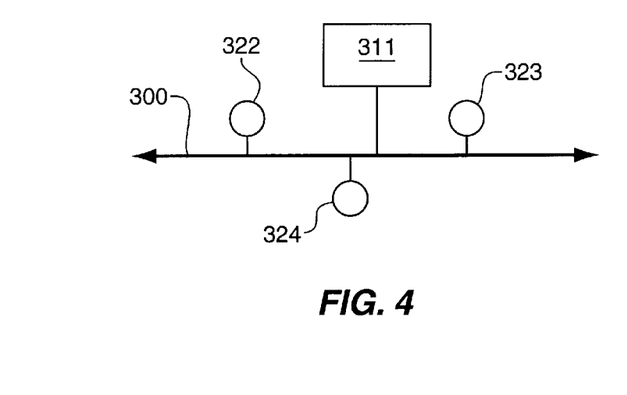
FIG. 4 shows a typical system architecture for the communication system of the present invention.

FIG. 4 illustrates an example of the system architecture. As shown, the architecture includes two (2) types of nodes connected to a common communication channel 300, namely master nodes 311 and slave nodes 322, 323 and 324. The master node 311 starts a communication round by sending a Fireworks message (FW).

Figure 5:
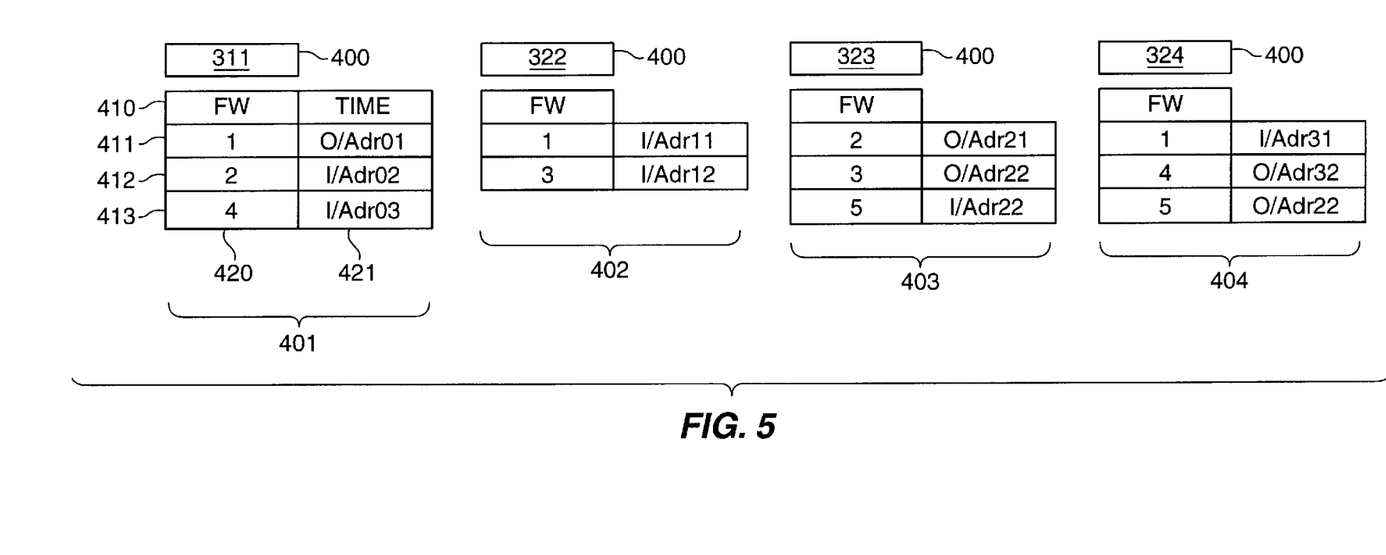
FIG. 5 shows typical Message Description Lists (MEDLs) used with the system architecture shown in FIG. 4.

FIG. 5 illustrates an example of four (4) MEDLs found in the four (4) nodes 311, 322, 323 and 324 of the architecture shown in FIG. 3. Note that column 401 is the MEDL for the master node 311. Also note that the first field 400 at the top of each MEDL 311, 322, 323 and 324 denotes the name of the node.

Row 410 contains the MEDL header with the Fireworks byte (FW) of the MEDL.

The second field of the header 410 of the master MEDL 401 contains the information about the time when the master node must send the Fireworks byte.

The second MEDL 402 is designed for the node 322, the third MEDL 403 for the node 323 and the fourth MEDL 404 for the node 324.

The second part of each MEDL after the header describes the data message.

The first column 420 of each MEDL contains the position of the byte in the round.

The second column 421 of each MEDL describes where this byte is Input (I) or Output (O) and the address of the byte in the memory of the node.

The MEDLs illustrated are for five (5) one byte messages. According to the MEDL of FIG. 5 Byte 1 of the round (after the Fireworks byte) is produced by node 311 and consumed by node 322 and by node 324.

Byte 2 is produced by node 323 and consumed by node 311.

Byte 3 is produced by node 323 and consumed by node 322.

Byte 4 is produced by node 324 and consumed by node 311.

Finally, Byte 5 is produced by node 324 and consumed by node 323. After Byte 5, the processing of this MEDL is terminated and each node waits for the next Fireworks byte from the active master node.

In case the active master fails, a secondary master will take over after the multimaster timeout (MMT). This is an application specific timeout parameter that is determined by the length of the longest MEDL. It has no influence on the data efficiency of the protocol in a fault-free environment.

Since the sequence of messages is determined a priori by the definition of the active MEDL, it is not necessary to carry the identifier of a message as part of the message. All eight data bits of a message are true data bits. This improves the data efficiency of this new data transmission method significantly, particularly for the short one byte messages that are typical for automotive body electronics applications.

To explain the influence of the different parameters, the data efficiency of this new message transmission method is calculated for a number of different scenarios in the following table.

| n | dtrans | dproc | $\epsilon$ | $\rho$ | g | tt | $\epsilon f$ | $\rho f$ | gf | $\eta$ % |
|---|--------|-------|---|---|---|------|------|------|------|------|
| 32 | 1100 | 50 | 5 | $10^{-4}$ | 4 | 1186 | 15.8 | 1.29 | 12.9 | 65.8 |
| 32 | 1100 | 50 | 5 | $10^{-2}$ | 4 | 1186 | 15.8 | 129 | 12.9 | 59.5 |
| 32 | 1100 | 50 | 50 | $10^{-2}$ | 4 | 1186 | 158 | 129 | 12.9 | 53.8 |

In all cases, we assume a transmission rate of 10 kbaud and a processing time of 50 $\mu$sec. The reading error $\epsilon$ is assumed to be 5 $\mu$sec if the protocol task is at the highest priority and 50 $\mu$sec if another task with a processing time of about 50 $\mu$sec can pre-empt the protocol task. The drift rate of the clock $\rho$ is assumed to be $10^{-4}$ if the resonator is a quartz resonator, and $10^{-2}$ if the resonator is a ceramic resonator. The granularity of the local clock is assumed to be 4 $\mu$sec in all cases.

The transmission time for a "perfect system" is presented in column "tt". Column "$\epsilon f$" shows the additional delay caused by the reading error E, i.e. in essence the interrupt response time. Column "$\rho f$" gives the additional delay caused by the drift of the resonator, while column "gf" contains the additional delay caused by the granularity of the local clock. Finally, column $\eta$
contains the data efficiency. The parameters are selected from the benchmark example published in [1992 SAE Handbook, Vol. 2, Society of Automotive Engineers, 400 Commonwealth Drive, Warrendale, Pa., USA, 1992, pp. p. 20.301] where a loop with 32 total message bytes is considered. In this example, this new data transmission method achieves a data efficiency of about 53%. This is a significant improvement of the data efficiency of the widely used CAN protocol, which is about 23%. Furthermore, the interface between the host computer software and the communication software is simplified because no control signals are crossing this interface—the communication software decides autonomously, based on the contents of the MEDL, when a message has to be sent or is expected to arrive.

Furthermore, this new data transmission method has the advantage of a short error detection latency. The data receipt interrupt (RDI) is monitored by the time-out event DPT. In case the message does not arrive before DPT, an omission error is immediately detected. No event-triggered protocol can provide such a short error detection latency.

This new data transmission method can be implemented on any single chip microcontroller with a standard communication control unit and a timer. The protocol software is executed by the host computer. Since no hardware modification is necessary, this is a very low cost implementation strategy.

If the functionality of the communication control unit hardware is augmented, e.g., by providing a microcontrollable protocol processor with a simple instruction set and a dedicated timer, then the protocol can be executed autonomously in the communication control unit and the interface to the host processor is formed by a shared data area in the memory where all relevant incoming and outgoing messages are stored. In this latter case, no processing cycles have to be taken away from the host processor for the purpose of executing this new data transmission method, resulting in a fully autonomous operation of the communication system. Since the physical message format is the same for both implementation strategies, the two implementation strategies can be mixed on a single network.

While the invention has been described in detail with respect to a preferred embodiment thereof, it will be evident to those skilled in the art that certain modifications and alterations may be made without departing from the spirit and scope of the invention. In particular, the invention is not limited to applications in the automotive industry.

I claim:

1. A time-triggered method for the autonomous transmission of messages within a distributed real-time computer architecture comprising a plurality of nodes where each node has at least one communication control unit which is connected to a common communication channel shared by all nodes and where the communication is organized into rounds, and where the structure and the attributes of a round are previously defined in a message descriptor list that specifies at which temporal position of the round a node has to send or receive a particular message characterized in that every round starts with a control message that is sent by the active master and which specifies which one of the previously defined message descriptor lists has to be selected for the control of the current round and where the transmission continues autonomously, driven by the progression of time, until the sequence of all data messages that is specified in the selected message descriptor list has been exchanged, the control message having characteristic attributes in one of the value domain and the time domain, and wherein these characteristic attributes of the control message are significantly different from those of the data messages, and the control message having an even parity while the data messages have an odd parity or vice versa and wherein the time interval between the control message and the first data message is significantly longer than the time interval between successive data messages.

2. The method according to claim 1 characterized in that the arrival of a new message is interpreted as a global synchronization event that is used to periodically re-synchronize the local clock in each node.

3. The method according to to claim 1 characterized in that the start of the next round will occur autonomously at a previously determined point on the synchronized time axis.

4. The method according to claim 1 characterized in that the time window, during which a new message is expected to arrive at a node, is monitored by the receiving node to detect with minimal delay when a message is missing.

5. An apparatus that implements the data transmission method according to claim 1 characterized in that it is based on an available communication control unit (e.g., UART, CAN, J1850 or others) and where this new transmission method is implemented in software or hardware or a combination of software and hardware, and where the device is either a stand alone communication control unit or is part of a single chip microcomputer.

6. An apparatus according to claim 5 characterized in that the hardware of the communication control unit (e.g., UART, CAN, J 1850, or others) is augmented, e.g., by a microcontrollable protocol processor and a timer, such that this method can be executed autonomously within the augmented communication control unit.

* * * * *

UNITED STATES PATENT AND TRADEMARK OFFICE
CERTIFICATE OF CORRECTION

PATENT NO. : 6,145,008
DATED : November 7, 2000
INVENTOR(S) : Hermann Kopetz

It is certified that error appears in the above-identified patent and that said Letters Patent is hereby corrected as shown below:

Title page,
Add:

-- [30]    Foreign Application Priority Data

Sept 13, 1994    AT    Austria    A 1750/94 --

Column 1,
Lines 23-24, delete "defined of a priori" and insert in place thereof -- previously defined --.

Signed and Sealed this

Twenty-ninth Day of July, 2003

JAMES E. ROGAN
*Director of the United States Patent and Trademark Office*